May 3, 1932.  H. S. STEEN  1,856,664
FAUCET
Filed Feb. 16, 1931  2 Sheets-Sheet 1
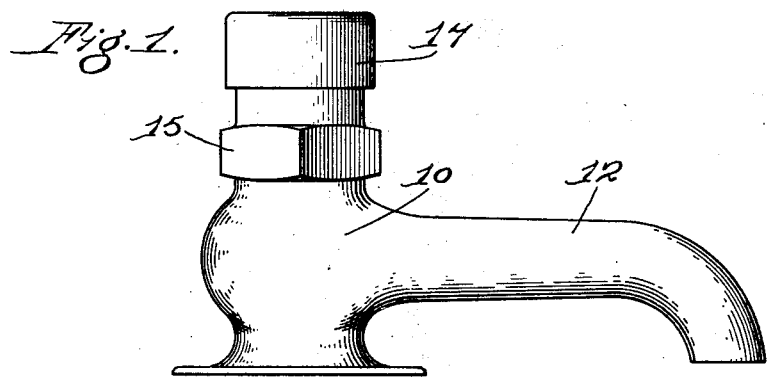
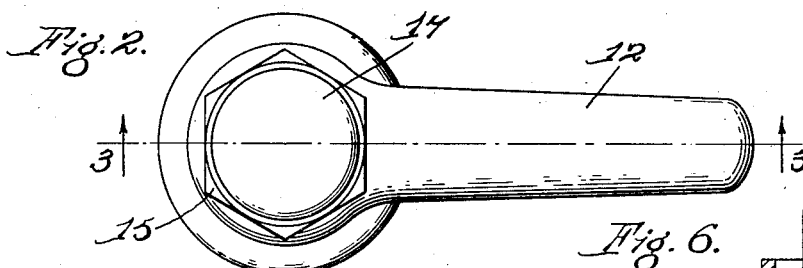
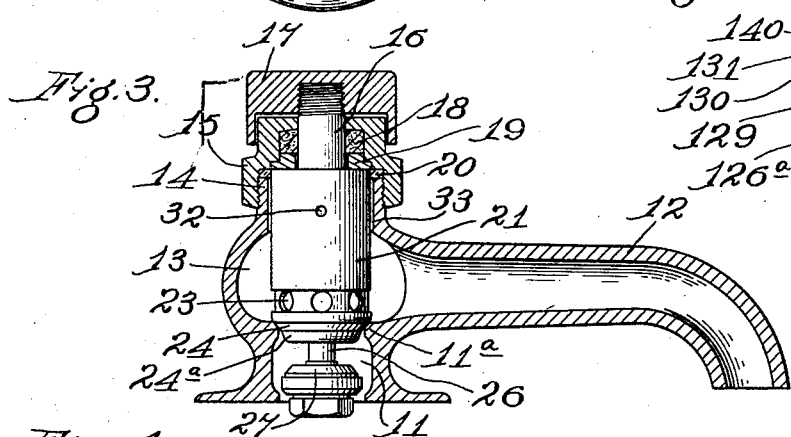
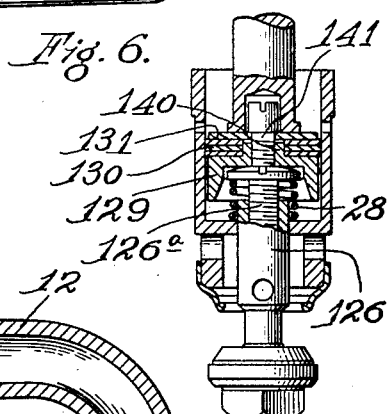
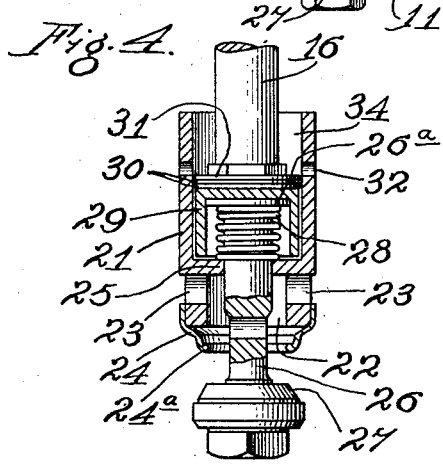
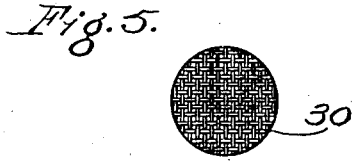
Inventor.
Harry S. Steen.
By Dyrenforth, Lee, Chritton & Wiles.
Attys.

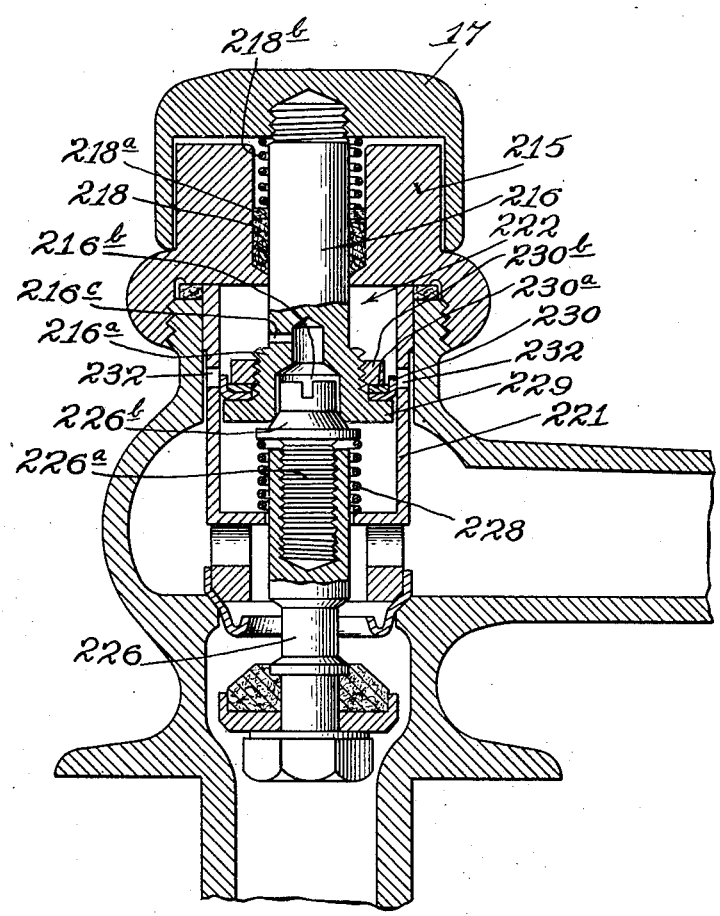

Patented May 3, 1932

1,856,664

UNITED STATES PATENT OFFICE

HARRY S. STEEN, OF CHICAGO, ILLINOIS, ASSIGNOR TO THE CHICAGO FAUCET COMPANY, OF CHICAGO, ILLINOIS, A CORPORATION OF ILLINOIS

FAUCET

Application filed February 16, 1931. Serial No. 516,181.

This invention relates to improvements in faucets and, more especially, self-closing faucets.

Among the features of my invention is the provision of improved means for retarding the closing of the faucet. Means are also providing for easily varying the rate of closing.

Another feature of my invention is the provision of a faucet of the character referred to, in which all the operating parts, including the seat, can be easily and quickly removed for repair, replacement or other purposes.

Other features and advantages of my invention will appear more fully as I proceed with my specification.

In those forms of devices embodying the features of my invention shown in the accompanying drawings—

Figure 1 is a view in side elevation; Fig. 2 is a top plan view; Fig. 3 is a view taken as indicated by the line 3 of Fig 2; Fig. 4 is a fragmentary vertical sectional view of the operating parts showing the same removed from the faucet; Fig. 5 is a top plan view of one of the discs used for controlling the speed of closing; Fig. 6 is a view similar to Fig. 4, showing a modified form; and Fig. 7 is a view similar to Fig. 6 showing a modified form.

As shown in the drawings, 10 indicates a suitable casing with an inlet opening 11 and a discharge spout 12. At the juncture of the spout and the inlet the casing is preferably somewhat enlarged to provide the chamber 13, the latter being open at the top, said opening being surrounded by the upstanding threaded rim 14.

Numeral 15 indicates a cap threaded onto the rim 14 and provided with a central opening through which the operating pin 16 extends. Numeral 17 indicates a cap threaded onto the upper end of the pin and adapted to be depressed to open the faucet. Packing 18 is provided to make a water-tight joint where the pin 16 extends through the cap 15, said packing being held in position by a washer 19. Numeral 20 indicates a gasket or washer to make a tight joint between the rim 14 and cap 15.

Reference numeral 21 indicates a removable barrel or cylinder, open at the bottom to form an inlet 22 and provided with radial outlet apertures 23 near the bottom. The lower end of the cylinder 21 carries a removable seat 24 adapted to be held in watertight contact with the rim 11$^a$, surrounding the upper end of the inlet opening 11, when the cap 15 is screwed into place.

Just above the holes 23, the cylinder 21 is provided with an apertured partition or diaphragm 25 through which extends the rod 26 carrying the valve 27 on its lower end, said valve adapted to seat against the lower edge 24$^a$ of the seat 24 to close the valve. The rod 26 is yieldingly urged upwardly by the spring 28 lying above the partition 25, the rod being provided at its upper end with an enlargement 26$^a$ above the spring.

Numeral 29 indicates a cap over the upper end of the rod 26. Lying on the cap 29 is a plurality (here shown as three) of fabric discs 30 and on top of them preferably a metal disc 31. One of the discs 30 is shown in Fig. 5. These discs fit fairly tight in the cylinder 21 but not tight enough to prevent downward manual pressure on the cap 17 from moving them downwardly to open the faucet. When the faucet is in full open position, as shown in Fig. 4, the spring 28 is compressed and the upper edge of the disc 31 is below the holes 32 in the cylinder 21. When in this position, water will pass through the small space 33 surrounding the cylinder 21, enter the holes 32 and fill the space 34 in the cylinder above the discs 30 and 31.

When pressure on the cap 17 is released, the spring 28 urges the rod 26 upwardly to close the faucet; but as soon as the discs 30, 31 pass the holes 32, water will be trapped in the space 34 and upward movement of the rod 26 will be retarded. The closing of the faucet will then be continued only as rapidly as permitted by leakage or escape of water by the discs 30, 31 out of the shrinking space 34. The metal disc 31 is preferably made somewhat smaller than the fabric discs 30, its primary function being to take the thrust of the lower end of the rod 16. The rate of closing can be varied as desired by changing the number, size and character of the discs 30.

It will be seen that all the working parts, including the seat 24, can be easily removed through the top of the faucet by merely taking off the cap 15. After this cap is removed with the rod 16, the cylinder 21 with the rod 26 and their associated parts will come out as a unit.

In Fig. 6, I have shown a modified form. It is to be understood that the parts here shown resemble, in construction and operation, the parts shown in Fig. 4, with the following exceptions. The rod 126, corresponding to the rod 26, is provided at its upper end with an adjusting screw 126$^a$ instead of the head 26$^a$, and the spring 28 lies under this head. This adjusting screw permits an adjustment of the travel of the piston. The cap 129 resembles the cap 29, except that it is provided with a central boss 140 in which is mounted the screw 141. Instead of using disc washers 30 in this construction, there are provided circular rings or washers 130 having holes to accommodate the boss 140 and screw 141. Above the fabric washers 130 is a metal washer 131 adapted to be engaged by the head of the screw 141. The boss 140 is low enough so that the screw 141 may be screwed down to push down the washer 131 to squeeze the fabric discs 130. In this manner, the fabric discs may be more or less squeezed and the friction thus regulated to adjust the speed of closing of the faucet.

In the modified form shown in Fig. 7, the piston is attached to the cap instead of being carried by the valve stem. As here shown, the construction is similar to those already described, with the following exceptions. The retarding piston, indicated by 229, takes the place of the caps or retarding pistons, indicated by 29 and 129 in the other forms. This retarding piston 229 is integrally formed on the lower end of the stem 216 which resembles the stem 16 of Fig. 3 and carries on its upper end the pushbutton or cap 17. On top of the piston 229, there is provided a cup washer 230 operating in the cylinder 221. This cup washer is held in place by a metal washer 230$^a$ above it which, in turn, is held down by the nut 230$^b$ threaded on the enlarged portion 216$^a$ of the stem 216. The cap 215 is similar to the cap 15 of Fig. 3, but made somewhat higher to give room for the packing 218 around the stem 216, said packing adapted to be urged downwardly by the washer 218$^a$ and the spring 218$^b$ above it. The rod 226 corresponding to the rods 26 and 126 of the other forms, is provided at its upper end with a screw 226$^a$ very similar to the screw 126$^a$ of Fig. 6, except that the head thereof is made somewhat higher and provided with a beveled portion 226$^b$ adapted to seal the lower end of the opening 216$^b$ provided in the lower end of the stem 216 to accommodate said head. In this construction, the spring 228 corresponds to the spring 28 of Fig. 6. Numeral 216$^c$ indicates a bleed-hole through the side of the stem 216 leading from the space 222 in the cylinder above the piston to the chamber 216$^b$. The cylinder 221 is provided with ports 232 similar to the ports shown in Fig. 4. In the construction shown, by making the device so that the piston is carried by the rod 216, the cap or pushbutton 17 is not permitted to rise faster than the piston itself.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A faucet of the character described, including; a casing with an inlet opening and a discharge opening; a removable cylinder in said casing carrying a seat held against the rim of the inlet opening, the lower end of said cylinder being provided with an inlet opening registering with the inlet opening in the casing, and a discharge opening communicating with the discharge opening in the casing; a rod slidably mounted in said cylinder carrying a valve on its lower end below said seat; an adjusting screw in the upper end of said rod; means for yieldingly urging said rod upwardly to cause said valve to rest on said seat to close the faucet, said means including a spiral spring surrounding said rod lying under the head of said adjusting screw; manually operable means for pressing the rod downwardly to open the faucet; and means for retarding the upward movement of said rod, said means including a disc in the cylinder adapted to be moved with the rod, said disc adapted to trap water in the cylinder above the disc when depressed, water so trapped being permitted to escape slowly to permit upward movement of the disc at a retarded speed.

2. A faucet of the character described, including; a casing with an inlet opening and a discharge opening; a removable cylinder in said casing carrying a seat held against the rim of the inlet opening, the lower end of said cylinder being provided with an inlet opening registering with the inlet opening in the casing, and a discharge opening communicating with the discharge opening in the casing; a rod slidably mounted in said cylinder carrying a valve on its lower end below said seat; means for yieldingly urging said rod upwardly to cause said valve to rest on said seat to close the faucet; manually operable means for pressing the rod downwardly to open the faucet; means for retarding the upward movement of said rod, said means including a disc in the cylinder adapted to be moved with the rod, said disc adapted to trap water in the cylinder above the disc when depressed, water so trapped being permitted to escape slowly to permit upward movement of the disc at a retarded speed; and means for adjusting the frictional resistance of said disc in said cylinder.

3. A faucet as claimed in claim 2, provided with a plurality of discs in the cylinder.

4. A faucet of the character described, including; a casing with an inlet opening and a discharge opening; a removable cylinder in said casing carrying a seat held against the rim of the inlet opening, the lower end of said cylinder being provided with an inlet opening registering with the inlet opening in the casing, and a discharge opening communicating with the discharge opening in the casing; a rod slidably mounted in said cylinder carrying a valve on its lower end below said seat; means for yieldingly urging said rod upwardly to cause said valve to rest on said seat to close the faucet; manually operable means for pressing the rod downwardly to open the faucet; means for retarding the upward movement of said rod, said means including a disc in the cylinder adapted to be moved with the rod, said disc adapted to trap water in the cylinder above the disc when depressed, water so trapped being permitted to escape slowly to permit upward movement of the disc at a retarded speed; and adjustable means for squeezing said disc to vary the frictional resistance of the disc in the cylinder.

5. A faucet of the character described, including; a casing with an inlet opening and a discharge opening; a removable cylinder in said casing carrying a seat held against the rim of the inlet opening, the lower end of said cylinder being provided with an inlet opening registering with the inlet opening in the casing, and a discharge opening communicating with the discharge opening in the casing; a rod slidably mounted in said cylinder carrying a valve on its lower end below said seat; means for yieldingly urging said rod upwardly to cause said valve to rest on said seat to close the faucet; manually operable means for pressing the rod downwardly to open the faucet; and means for retarding the upward movement of said rod, said means including a disc in the cylinder adapted to be moved with the rod, said disc adapted to trap water in the cylinder above the disc when depressed, water so trapped being permitted to escape slowly to permit upward movement of the disc at a retarded speed, said disc being carried by the manually operable means for pressing the rod downwardly to open the faucet.

In witness whereof, I have hereunto set my hand this 12th day of February, 1931.

HARRY S. STEEN.